(12) United States Patent
Ebenezer (10) Patent No.: US 10,475,471 B2
(45) Date of Patent: Nov. 12, 2019

(54) DETECTION OF ACOUSTIC IMPULSE EVENTS IN VOICE APPLICATIONS USING A NEURAL NETWORK

(71) Applicant: Cirrus Logic International Semiconductor Ltd., Edinburgh (GB)

(72) Inventor: Samuel Pon Varma Ebenezer, Tempe, AZ (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/583,012

(22) Filed: May 1, 2017

(65) Prior Publication Data

US 2018/0102136 A1  Apr. 12, 2018

Related U.S. Application Data (63) Continuation-in-part of application No. 15/290,685, filed on Oct. 11, 2016, now Pat. No. 10,242,696.

(51) Int. Cl.
*G10L 25/84* (2013.01)
*G10L 25/78* (2013.01)
(Continued)

(52) U.S. Cl.
CPC .............. *G10L 25/84* (2013.01); *G10L 15/02* (2013.01); *G10L 15/16* (2013.01);
(Continued)

(58) Field of Classification Search
CPC ......... G10L 21/02; G10L 25/30; G10L 25/84; G10L 25/87; G10L 25/78; G10L 21/0216; G10L 2021/02166
(Continued)

(56) References Cited

U.S. PATENT DOCUMENTS 5,991,718 A * 11/1999 Malah ..................... G10L 25/78
704/208
6,240,381 B1 * 5/2001 Newson .................. G10L 25/93
704/214
(Continued)

FOREIGN PATENT DOCUMENTS

GB        2456296 A     7/2009
KR     101624926 B     5/2016
(Continued)

OTHER PUBLICATIONS

Manohar, et al. "Speech enhancement in nonstationary noise environments using noise properties." Speech Communication 48.1, Jan. 2006, pp. 96-109.*
(Continued)

*Primary Examiner* — James S Wozniak
(74) *Attorney, Agent, or Firm* — Jackson Walker L.L.P.

(57) ABSTRACT

In accordance with embodiments of the present disclosure, an integrated circuit for implementing at least a portion of an audio device may include an audio output configured to reproduce audio information by generating an audio output signal for communication to at least one transducer of the audio device, a microphone input configured to receive an input signal indicative of ambient sound external to the audio device, and a processor configured to implement an impulsive noise detector. The impulsive noise detector may comprise a plurality of processing blocks for determining a feature vector based on characteristics of the input signal and a neural network for determining based on the feature vector whether the impulsive event comprises a speech event or a noise event.

26 Claims, 9 Drawing Sheets

(51) Int. Cl.
*G10L 15/02* (2006.01)
*G10L 21/0232* (2013.01)
*G10L 25/30* (2013.01)
*G10L 21/02* (2013.01)
*G10L 21/0216* (2013.01)
*G10L 15/16* (2006.01)
*G10L 25/21* (2013.01)

(52) U.S. Cl.
CPC .......... *G10L 21/0232* (2013.01); *G10L 25/21* (2013.01); *G10L 25/30* (2013.01); *G10L 25/78* (2013.01); *G10L 21/02* (2013.01); *G10L 21/0216* (2013.01); *G10L 2021/02166* (2013.01)

(58) Field of Classification Search
USPC .................................. 704/226–227, 232–233
See application file for complete search history.

(56) References Cited

U.S. PATENT DOCUMENTS

| | | | |
|---|---|---|---|
| 6,453,291 B1* | 9/2002 | Ashley | G10L 25/78 704/200 |
| 7,219,065 B1* | 5/2007 | Vandali | G10L 21/0364 704/200.1 |
| 7,492,889 B2 | 2/2009 | Ebenezer | |
| 8,565,446 B1 | 10/2013 | Ebenezer | |
| 9,361,885 B2 | 6/2016 | Ganong, III | |
| 9,542,938 B2* | 1/2017 | Xue | G10L 25/51 |
| 2003/0204394 A1* | 10/2003 | Garudadri | G10L 15/02 704/201 |
| 2004/0137846 A1* | 7/2004 | Behboodian | G10L 19/012 455/63.1 |
| 2005/0108004 A1* | 5/2005 | Otani | G10L 15/1807 704/205 |
| 2006/0100868 A1* | 5/2006 | Hetherington | G10L 21/0208 704/226 |
| 2008/0077403 A1* | 3/2008 | Hayakawa | G10L 15/20 704/233 |
| 2009/0125899 A1* | 5/2009 | Unfried | G06F 8/67 717/168 |
| 2009/0154726 A1* | 6/2009 | Taenzer | G10L 25/78 381/94.1 |
| 2010/0057453 A1* | 3/2010 | Valsan | G10L 25/78 704/232 |
| 2010/0280827 A1* | 11/2010 | Mukerjee | G10L 15/142 704/236 |
| 2010/0332221 A1* | 12/2010 | Yamanashi | G10L 19/24 704/207 |
| 2011/0153313 A1 | 6/2011 | Etter | |
| 2011/0178795 A1* | 7/2011 | Bayer | G10L 19/002 704/205 |
| 2011/0305347 A1* | 12/2011 | Wurm | G10K 11/178 381/71.1 |
| 2012/0076311 A1* | 3/2012 | Isabelle | G10L 21/0208 381/57 |
| 2013/0259254 A1* | 10/2013 | Xiang | G10K 11/175 381/73.1 |
| 2013/0301842 A1* | 11/2013 | Hendrix | G10K 11/002 381/71.1 |
| 2014/0270260 A1* | 9/2014 | Goertz | G10L 25/84 381/110 |
| 2015/0070148 A1* | 3/2015 | Cruz-Hernandez | G08B 6/00 340/407.1 |
| 2015/0081285 A1* | 3/2015 | Sohn, II | G10L 21/02 704/219 |
| 2015/0348572 A1* | 12/2015 | Thornburg | G10L 25/84 704/219 |
| 2015/0371631 A1* | 12/2015 | Weinstein | G10L 15/08 704/256.4 |
| 2015/0380013 A1* | 12/2015 | Nongpiur | G10L 25/51 704/231 |
| 2016/0029121 A1* | 1/2016 | Nesta | G10L 19/008 381/71.1 |
| 2016/0093313 A1* | 3/2016 | Vickers | G10L 25/78 704/232 |
| 2016/0118056 A1* | 4/2016 | Choo | G10L 19/002 381/100 |
| 2016/0133264 A1* | 5/2016 | Mani | G10L 19/06 704/205 |
| 2016/0210987 A1* | 7/2016 | Sugiyama | G10L 21/0232 |
| 2017/0025132 A1* | 1/2017 | Moriya | G10L 19/06 |
| 2017/0040016 A1* | 2/2017 | Cui | G10L 15/063 |
| 2017/0040029 A1 | 2/2017 | Ebenezer | |
| 2017/0110115 A1* | 4/2017 | Song | G10L 15/02 |
| 2017/0200446 A1* | 7/2017 | Cui | G10L 15/063 |
| 2017/0229117 A1* | 8/2017 | van der Made | G10L 15/16 |
| 2017/0263240 A1* | 9/2017 | Kalinli-Akbacak | G10L 25/03 |
| 2018/0068654 A1* | 3/2018 | Cui | G10L 15/075 |
| 2018/0102135 A1 | 4/2018 | Ebenezer | |

FOREIGN PATENT DOCUMENTS

| | | |
|---|---|---|
| KR | 20160073874 A | 6/2016 |
| KR | 101704926 B | 2/2017 |
| WO | 2017027397 A2 | 2/2017 |

OTHER PUBLICATIONS

Ahmed, Rehan, et al. "Speech Source Separation Using a Multi-Pitch Harmonic Product Spectrum-Based Algorithm." Audio Engineering Society Convention 130. Audio Engineering Society, May 2011, pp. 1-6. (Year: 2011).*

Bell, Peter, et al. "The UEDIN ASR systems for the IWSLT 2014 evaluation." Proc. IWSLT. Dec. 2014, pp. 1-9. (Year: 2014).*

Sivasankaran, Sunit, et al. "Robust ASR using neural network based speech enhancement and feature simulation." Automatic Speech Recognition and Understanding (ASRU), 2015 IEEE Workshop on. IEEE, Dec. 2015, pp. 1-8. (Year: 2015).*

Zhuang, Xiaodan, et al. "Real-world acoustic event detection." Pattern Recognition Letters 31.12, Sep. 2010, pp. 1543-1551 (Year: 2010).*

Thomas, Samuel, et al. "Improvements to the IBM speech activity detection system for the DARPA RATS program." Acoustics, Speech and Signal Processing (ICASSP), 2015 IEEE International Conference on. IEEE, Apr. 2015, pp. 4500-4504. (Year: 2015).*

Thomas, Samuel, et al. "Improvements to the IBM speech activity detection system for the DARPA RATS program." 2015 IEEE International Conference on Acoustics, Speech and Signal Processing (ICASSP). IEEE, Aug. 2015, pp. 4500-4504. (Year: 2015).*

Kolbaek, Morten, et al. "Speech intelligibility potential of general and specialized deep neural network based speech enhancement systems." IEEE/ACM Transactions on Audio, Speech and Language Processing (TASLP) 25.1, Jan. 2017, pp. 153-167. (Year: 2017).*

Ebenezer, S.P., Adaptive Blocking Matrix with Spatial Pre-Whitening, Cirrus Logic, Inc., 2015.

Woo, H.K. et al., Robust voice activity detection algorithm for estimating noise spectrum, Electronics Letters, vol. 36, No. 2, pp. 180-181, 2000.

Ebenezer, S.P., "Detecting acoustic impulsive noises for voice applications," Cirrus Logic Inc., Jan. 27, 2017.

Bello, J.P. et al., A Tutorial on Onset Detection in Music Signals; IEEE Transactions on Speech and Audio Processing, vol. 13, No. 5, Sep. 2005, pp. 1035-1047.

Potamitis, I. et al., "Impulsive Noise Suppression Using Neural Networks", IEEE International Conference on Acoustics, Speech and Signal Processing, vol. 3, pp. 1871-1874, Jun. 2000.

Potamitis, I et al., "Impulsive noise suppression using neural networks", Acoustics, Speech, and Signal Processing 000, ICASSP '00, Proceedings, 2000 IEEE International Conference on Jun. 5-9, 2000, Piscataway, NJ, vol. 3, Jun. 5, 2000, pp. 1871-1874.

Ruhland, Marco et al., "Reduction of gaussian, supergaussian, and impulsive noise by interpolation of the binary mask residual", (56) References Cited

OTHER PUBLICATIONS

IEEE/ACM Transactions on Audio, Speech, and Language Processing, IEEE, vol. 23, No. 10, Oct. 1, 2015, pp. 1680-1691.
Czyzewski, Andrzej, "Learning Algorithms for Audio Signal Enhancement, Part 1: Neural Network Implementation for the Removal of Impulse Distortions", JAES vol. 45, No. 10, Oct. 31, 1997, pp. 815-831.
International Search Report and Written Opinion of the International Searching Authority, International Application No. PCT/US2017/055887, dated Feb. 2, 2018.
Hsu, Chung-Chien et al., "Voice activity detection based on frequency modulation of harmonics." Acoustics, Speech and Signal Processing (ICASSP), 2013 IEEE International Conference on. IEEE, Oct. 2013, pp. 6679-6683.
Sasaoka, Naoto et al., "Speech enhancement based on 4th order cumulant backward linear predictor for impulsive noise." Signal Processing (ICSP), 2012 IEEE 11th International Conference on. vol. 1. IEEE, Oct. 2012, pp. 217-131.
Combined Search and Examination Report, UKIPO, Application No. GB1716561.4, dated Apr. 3, 2018.
Examination Report under Section 17, UKIPO, Application No. GB1716561.4, dated Jul. 31, 2019.

* cited by examiner

DETECTION OF ACOUSTIC IMPULSE EVENTS IN VOICE APPLICATIONS USING A NEURAL NETWORK

RELATED APPLICATIONS

This application claims continuation-in-part priority to U.S. patent application Ser. No. 15/290,685, filed Oct. 11, 2016, and entitled "Detection of Acoustic Impulse Events in Voice Applications," which is incorporated herein by reference.

TECHNICAL FIELD

The field of representative embodiments of this disclosure relates to methods, apparatuses, and implementations concerning or relating to voice applications in an audio device. Applications include detection of acoustic impulsive noise events using a neural network based on the harmonic and sparse spectral nature of speech.

BACKGROUND

Voice activity detection (VAD), also known as speech activity detection or speech detection, is a technique used in speech processing in which the presence or absence of human speech is detected. VAD may be used in a variety of applications, including noise suppressors, background noise estimators, adaptive beamformers, dynamic beam steering, always-on voice detection, and conversation-based playback management. In many of such applications, high-energy and transient background noises that are often present in an environment are impulsive in nature. Many traditional VADs rely on changes in signal level on a full-band or sub-band basis and thus often detect such impulsive noise as speech, as a signal envelope of an impulsive noise is often similar to that of speech. In addition, in many cases, an impulsive noise spectrum averaged over various impulsive noise occurrences and an averaged speech spectrum may not be significantly different. Accordingly, in such systems, impulsive noise may be detected as speech, which may deteriorate system performance. For example, in a beamsteering application, false detection of an impulse noise as speech may result in steering a "look" direction of the beam-steering system in an incorrect direction even though an individual speaking is not moving relative to the audio device.

SUMMARY

In accordance with the teachings of the present disclosure, one or more disadvantages and problems associated with existing approaches to voice activity detection may be reduced or eliminated.

In accordance with embodiments of the present disclosure, an integrated circuit for implementing at least a portion of an audio device may include an audio output configured to reproduce audio information by generating an audio output signal for communication to at least one transducer of the audio device, a microphone input configured to receive an input signal indicative of ambient sound external to the audio device, and a processor configured to implement an impulsive noise detector. The impulsive noise detector may comprise a plurality of processing blocks for determining a feature vector based on characteristics of the input signal and a neural network for determining, based on the feature vector, whether the impulsive event comprises a speech event or a noise event.

In accordance with these and other embodiments of the present disclosure, a method for impulsive noise detection may include receiving an input signal indicative of ambient sound external to an audio device, determining a feature vector based on characteristics of the input signal, using a neural network to determine based on the feature vector whether the impulsive event comprises a speech event or a noise event, and reproducing audio information by generating an audio output signal for communication to at least one transducer of an audio device based on the input signal and the determination of whether the impulsive event comprises a speech event or a noise event.

Technical advantages of the present disclosure may be readily apparent to one of ordinary skill in the art from the figures, description, and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

Figure 1:
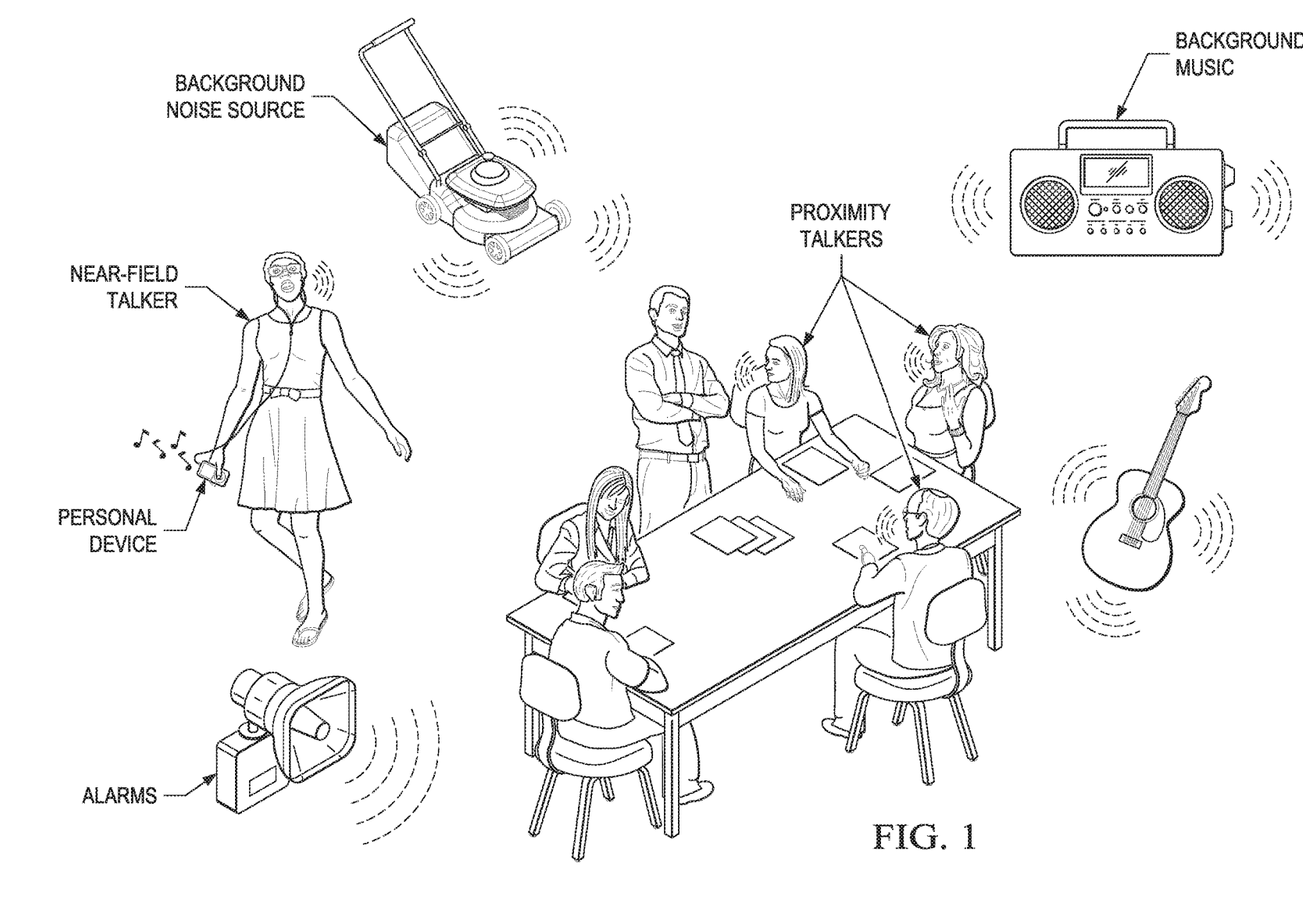
FIG. 1 illustrates an example of a use case scenario wherein various detectors may be used in conjunction with a playback management system to enhance a user experience, in accordance with embodiments of the present disclosure.

In accordance with embodiments of this disclosure, an automatic playback management framework may use one or more audio event detectors. Such audio event detectors for an audio device may include a near-field detector that may detect when sounds in the near-field of the audio device are detected, such as when a user of the audio device (e.g., a user that is wearing or otherwise using the audio device) speaks, a proximity detector that may detect when sounds in proximity to the audio device are detected, such as when another person in proximity to the user of the audio device speaks, and a tonal alarm detector that detects acoustic alarms that may have been originated in the vicinity of the audio device. FIG. 1 illustrates an example of a use case scenario wherein such detectors may be used in conjunction with a playback management system to enhance a user experience, in accordance with embodiments of the present disclosure.

Figure 2:
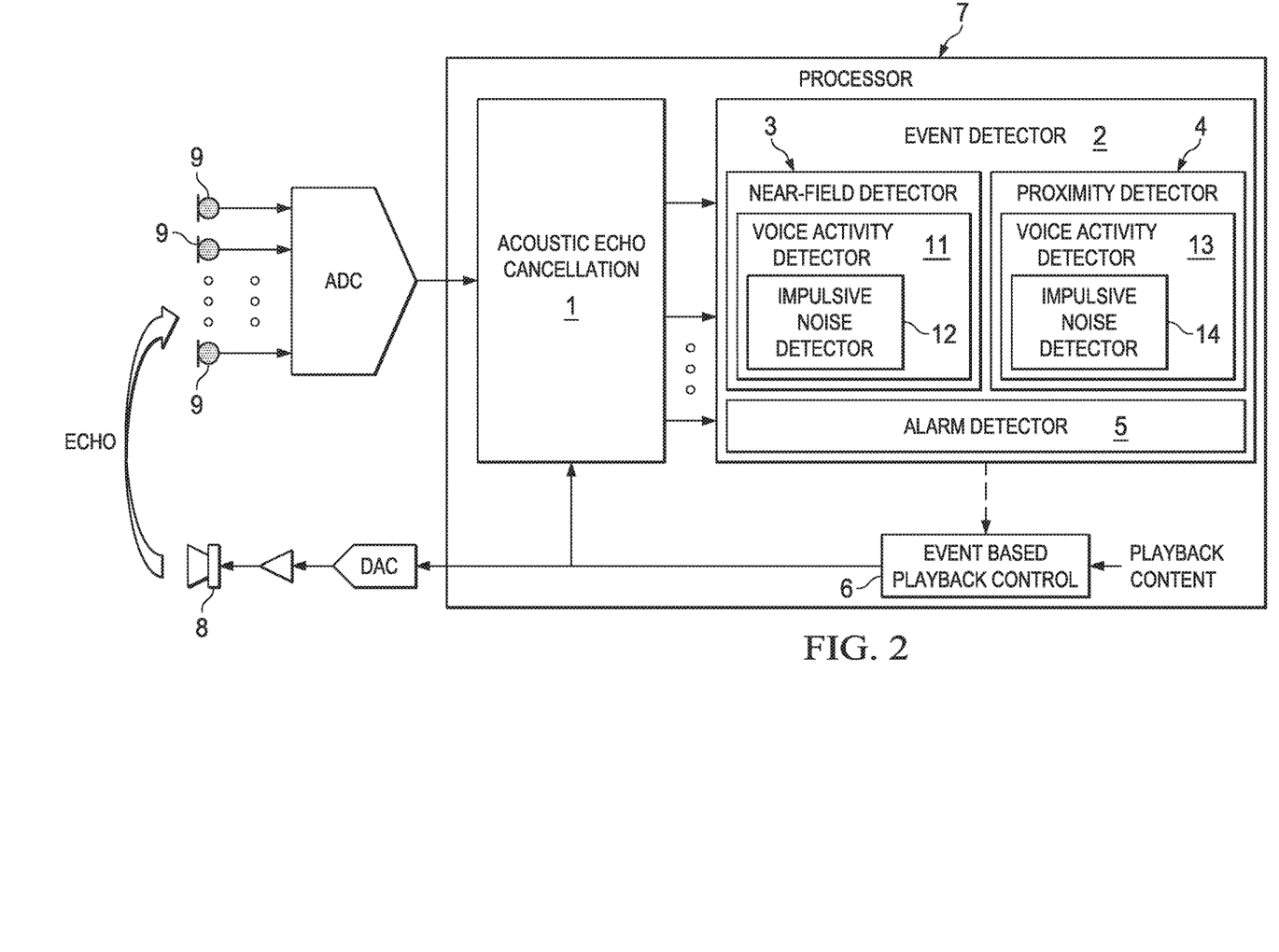
FIG. 2 illustrates an example playback management system, in accordance with embodiments of the present disclosure.

FIG. 2 illustrates an example playback management system that modifies a playback signal based on a decision from an event detector 2, in accordance with embodiments of the present disclosure. Signal processing functionality in a processor 7 may comprise an acoustic echo canceller 1 that may cancel an acoustic echo that is received at microphones 9 due to an echo coupling between an output audio transducer 8 (e.g., loudspeaker) and microphones 9. The echo reduced signal may be communicated to event detector 2 which may detect one or more various ambient events, including without limitation a near-field event (e.g., including but not limited to speech from a user of an audio device) detected by near-field detector 3, a proximity event (e.g., including but not limited to speech or other ambient sound other than near-field sound) detected by proximity detector 4, and/or a tonal alarm event detected by alarm detector 5. If an audio event is detected, an event-based playback control 6 may modify a characteristic of audio information (shown as "playback content" in FIG. 2) reproduced to output audio transducer 8. Audio information may include any information that may be reproduced at output audio transducer 8, including without limitation, downlink speech associated with a telephonic conversation received via a communication network (e.g., a cellular network) and/or internal audio from an internal audio source (e.g., music file, video file, etc.).

As shown in FIG. 2, near-field detector 3 may include a voice activity detector 11 which may be utilized by near-field detector 3 to detect near-field events. Voice activity detector 11 may include any suitable system, device, or apparatus configured to perform speech processing to detect the presence or absence of human speech. In accordance with such processing, voice activity detector 11 may include an impulsive noise detector 12. In operation, as described in greater detail below, impulsive noise detector 12 may predict an occurrence of a signal burst event of an input signal indicative of ambient sound external to an audio device (e.g., a signal induced by sound pressure on one or more microphones 9) to determine whether the signal burst event comprises a speech event or a noise event.

As shown in FIG. 2, proximity detector 4 may include a voice activity detector 13 which may be utilized by proximity detector 4 to detect events in proximity with an audio device. Similar to voice activity detector 11, voice activity detector 13 may include any suitable system, device, or apparatus configured to perform speech processing to detect the presence or absence of human speech. In accordance with such processing, voice activity detector 13 may include an impulsive noise detector 14. Similar to impulsive noise detector 12, impulsive noise detector 14 may predict an occurrence of a signal burst event of an input signal indicative of ambient sound external to an audio device (e.g., a signal induced by sound pressure on one or more microphones 9) to determine whether the signal burst event comprises a speech event or a noise event. In some embodiments, processor 7 may include a single voice activity detector having a single impulsive noise detector leveraged by both of near-field detector 3 and proximity detector 4 in performing their functionality.

Figure 3:
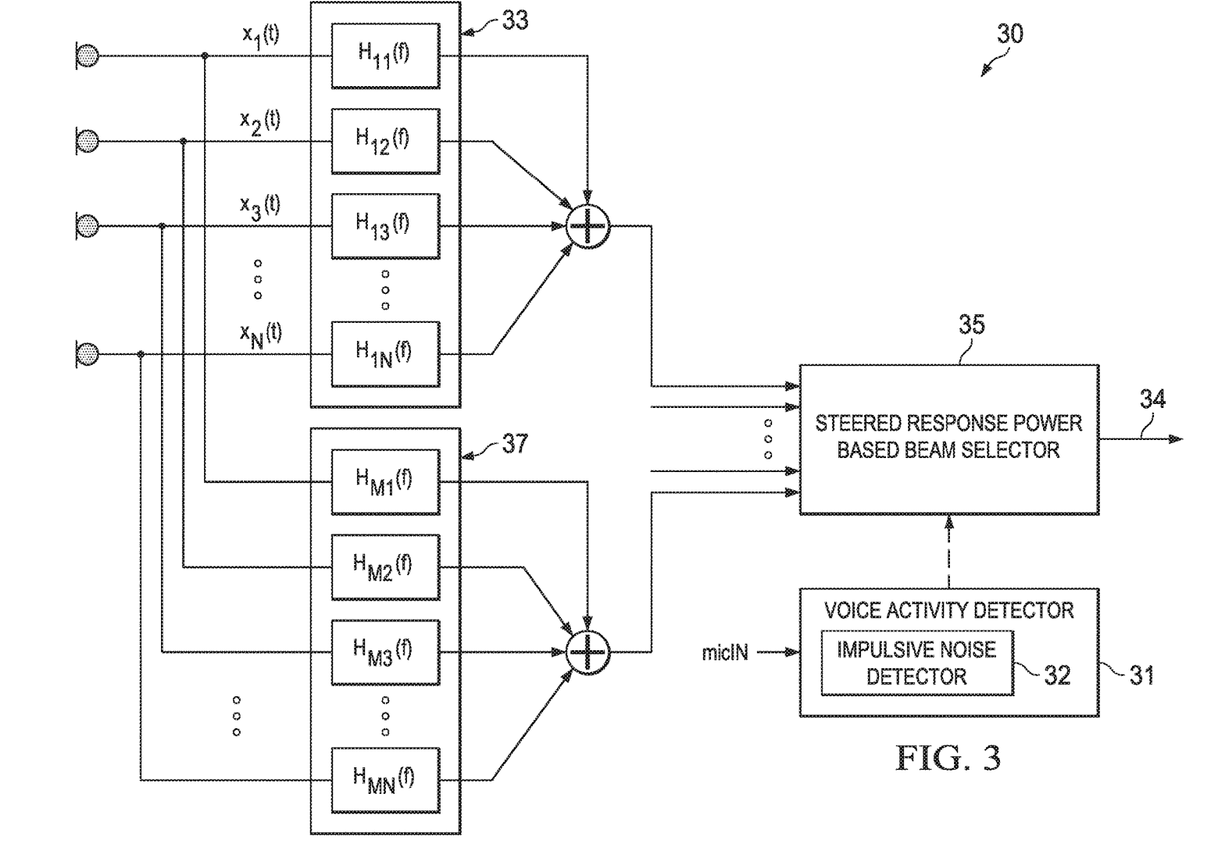
FIG. 3 illustrates an example steered response power based beamsteering system, in accordance with embodiments of the present disclosure.

FIG. 3 illustrates an example steered response power-based beamsteering system 30, in accordance with embodiments of the present disclosure. Steered response power-based beamsteering system 30 may operate by implementing multiple beamformers 33 (e.g., delay-and-sum and/or filter-and-sum beamformers) each with a different look direction such that the entire bank of beamformers 33 will cover the desired field of interest. The beamwidth of each beamformer 33 may depend on a microphone array aperture length. An output power from each beamformer 33 may be computed, and a beamformer 33 having a maximum output power may be switched to an output path 34 by a steered-response power-based beam selector 35. Switching of beam selector 35 may be constrained by a voice activity detector 31 having an impulsive noise detector 32 such that the output power is measured by beam selector 35 only when speech is detected, thus preventing beam selector 35 from rapidly switching between multiple beamformers 33 by responding to spatially non-stationary background impulsive noises.

Figure 4:
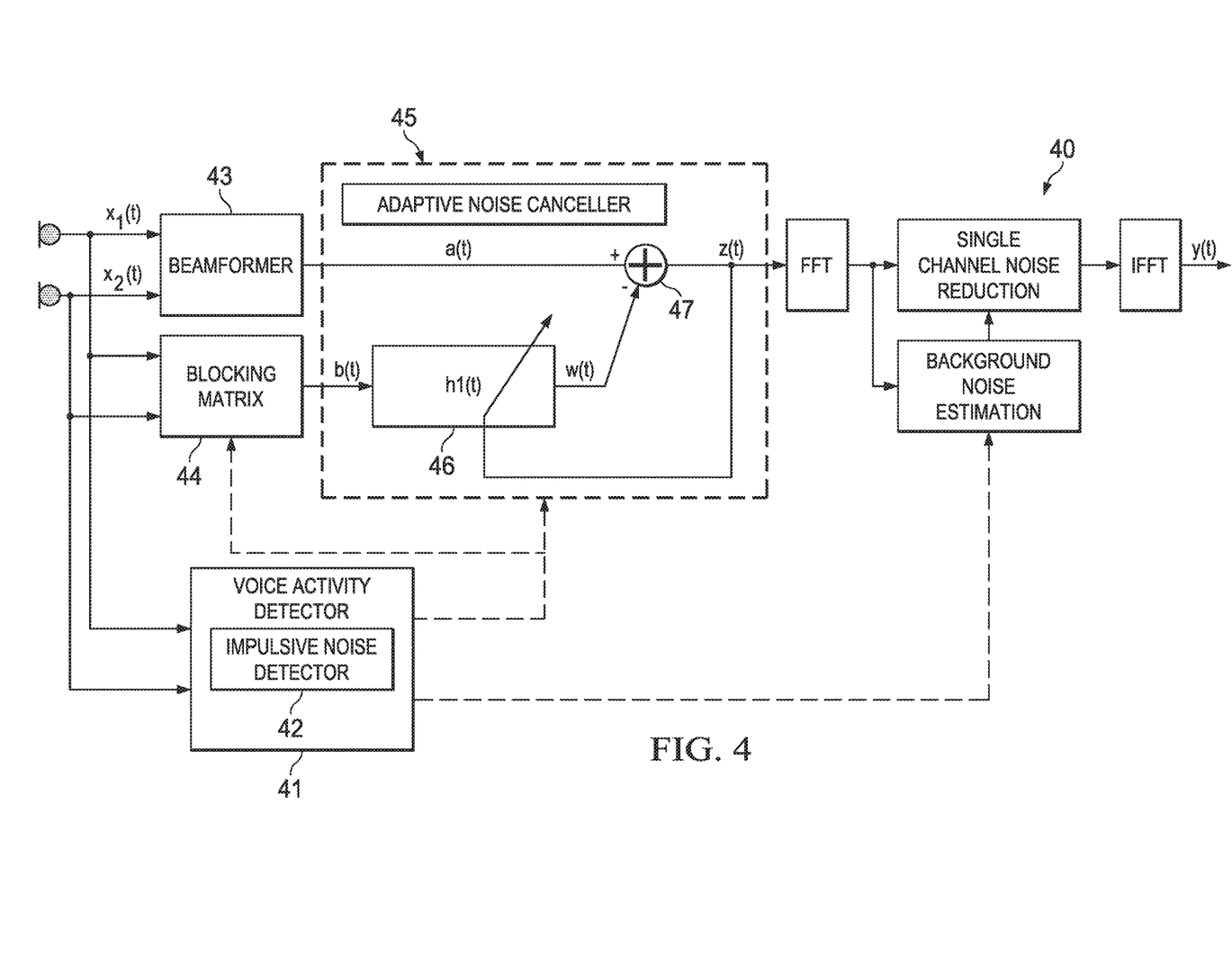
FIG. 4 illustrates an example adaptive beamformer, in accordance with embodiments of the present disclosure.

FIG. 4 illustrates an example adaptive beamformer 40, in accordance with embodiments of the present disclosure. Adaptive beamformer 40 may comprise any system, device, or apparatus capable of adapting to changing noise conditions based on the received data. In general, an adaptive beamformer may achieve higher noise cancellation or interference suppression compared to fixed beamformers. As shown in FIG. 4, adaptive beamformer 40 is implemented as a generalized side lobe canceller (GSC). Accordingly, adaptive beamformer 40 may comprise a fixed beamformer 43, blocking matrix 44, and a multiple-input adaptive noise canceller 45 comprising an adaptive filter 46. If adaptive filter 46 were to adapt at all times, it may train to speech leakage also causing speech distortion during a subtraction stage 47. To increase robustness of adaptive beamformer 40, a voice activity detector 41 having an impulsive noise detector 42 may communicate a control signal to adaptive filter 46 to disable training or adaptation in the presence of speech. In such implementations, voice activity detector 41 may control a noise estimation period wherein background noise is not estimated whenever speech is present. Similarly, the robustness of a GSC to speech leakage may be further improved by using an adaptive blocking matrix, the control for which may include an improved voice activity detector with an impulsive noise detector, as described in U.S. Pat. No. 9,607,603 entitled "Adaptive Block Matrix Using Pre-Whitening for Adaptive Beam Forming."

Figure 5:
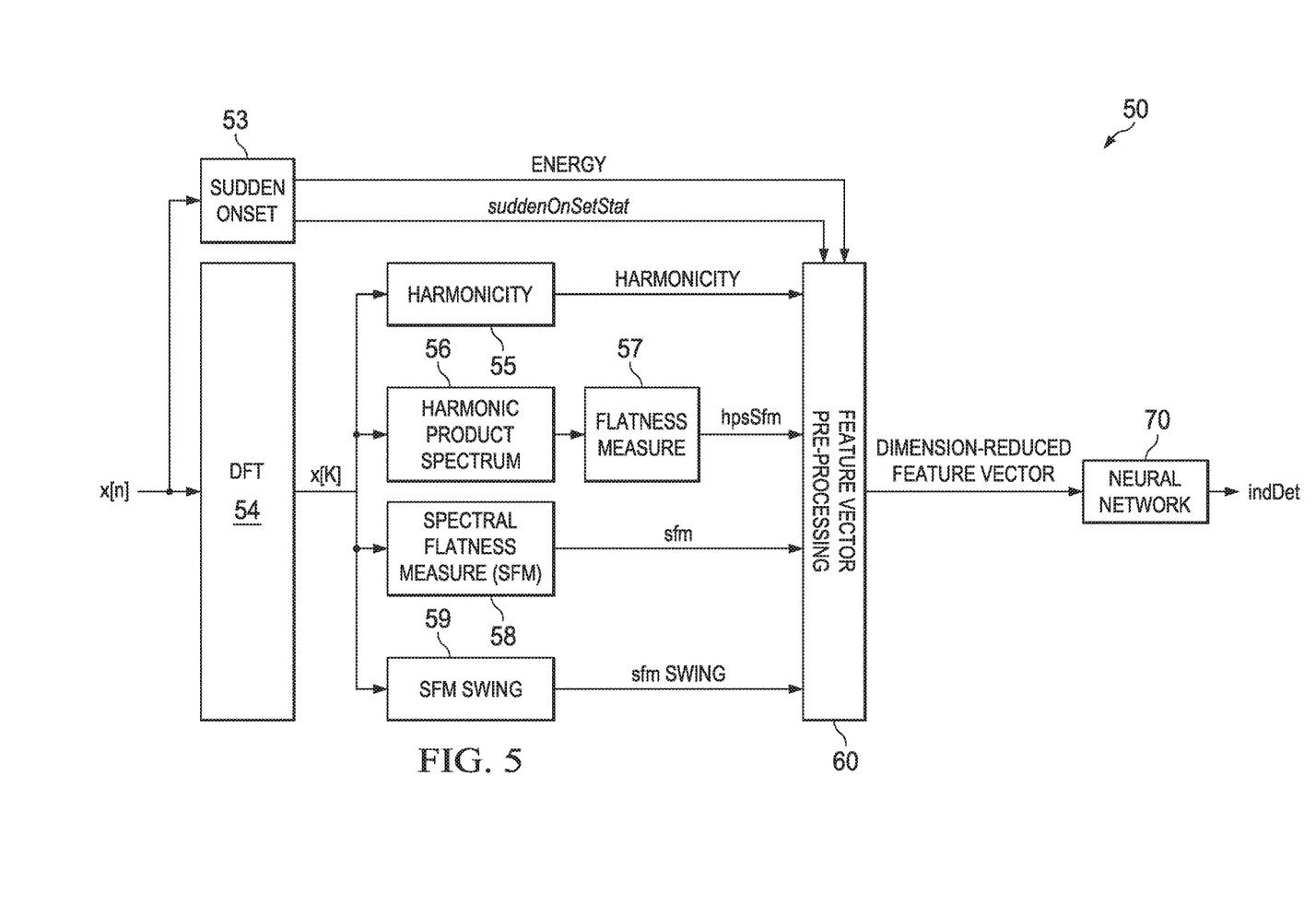
FIG. 5 illustrates a block diagram of an example impulsive noise detector, in accordance with embodiments of the present disclosure.

FIG. 5 illustrates a block diagram of an example impulsive noise detector 50, in accordance with embodiments of the present disclosure. In some embodiments, impulsive noise detector 50 may implement one or more of impulsive noise detector 12, impulsive noise detector 14, impulsive noise detector 32, and impulsive noise detector 42. Impulsive noise detector 50 may comprise any suitable system, device, or apparatus configured to exploit the harmonic nature of speech to distinguish impulsive noise from speech, as described in greater detail below.

As shown in FIG. 5, impulsive noise detector 50 may comprise a plurality of processing blocks (e.g., sudden onset calculation block 53, harmonicity calculation block 55, a harmonic product spectrum block 56, a harmonic flatness measure block 57, a spectral flatness measure (SFM) block 58, and a SFM swing block 59) for determining a feature vector based on characteristics of an input audio signal x[n], a feature vector pre-processing block 60 for pre-processing the feature vector to generate a dimension-reduced feature vector, and a neural network 70 for determining based on the feature vector (e.g., using the dimension-reduced feature vector) whether an impulsive noise event has occurred, as described in greater detail below.

Sudden onset calculation block 53 may comprise any system, device, or apparatus configured to exploit sudden changes in a signal level of input audio signal x[n] in order to generate statistics indicative of an existence or an absence of a forthcoming signal burst. For example, samples of input audio signal x[n] may first be grouped into overlapping frame samples and the energy of each frame computed. Sudden onset calculation block 53 may calculate the energy (shown as "energy" in FIG. 5) of a frame as:

$$E[l] = \sum_{n=1}^{N} x^2[n, l]$$

where N is the total number of samples in a frame, l is the frame index, and a predetermined percentage (e.g., 25%) of overlapping is used to generate each frame. Such energy measure statistic generated by sudden onset calculation block 53 may be communicated as a portion of the feature vector communicated to feature vector pre-processing block 60 and neural network 70.

Further, sudden onset calculation block 53 may calculate a sudden onset statistic (shown as "suddenOnSetStat" in FIG. 5) which exploits sudden changes in the signal level of input audio signal x[n] to predict a forthcoming signal burst. A normalized frame energy may be calculated as:

$$\hat{E}[m, l] = \frac{E[m]}{\max_{\forall m} E[m] - \min_{\forall m} E[m]}$$

where m=1, l−1, l−2, ..., l−L+1 and L is a size of the frame energy history buffer. The denominator in this normalization step may represent a dynamic range of frame energy over the current and past (L−1) frames. Sudden onset calculation block 53 may compute a sudden onset statistic as:

$$\gamma_{os}[l] = \frac{\max_{\forall m'} \hat{E}[m', l]}{\hat{E}[l, l]}$$

where m'=l−1, l−2, ..., l−L+1. One of skill in the art may note that the maximum is computed only over the past (L−1) frames. Therefore, if a sudden acoustic event appears in the environment, the frame energy at the onset of the event may be high and the maximum energy over the past (L−1) frames may be smaller than the maximum value. Therefore, the ratio of these two values may be small during the onset. Accordingly, the frame size should be such that the past (L−1) frames do not contain energy corresponding to the signal burst.

Because sudden onset calculation block 53 detects signal level fluctuations, the sudden onset statistic may also indicate the presence of sudden speech bursts. For example, the sudden onset statistic may indicate the presence of sudden speech bursts every time a speech event appears after a period of silence. Accordingly, impulsive noise detector 50 cannot rely solely on sudden onset calculation block 53 to accurately detect an impulsive noise, and other statistics described below (e.g., harmonicity, harmonic product spectrum flatness measure, spectral flatness measure, and/or spectral flatness measure swing of audio input signal x[n]) may exploit the harmonic and sparse nature of an instantaneous speech spectrum of audio input signal x[n] to determine if a signal onset is caused by speech or impulsive noise.

In order to extract spectral information of audio input signal x[n] in order to determine values of such parameters, impulsive noise detector 50 may convert audio input signal x[n] from the time domain to the frequency domain by means of a discrete Fourier transform (DFT) 54. DFT 54 may buffer, overlap, window, and convert audio input signal x[n] to the frequency domain as:

$$X[k, l] = \sum_{n=0}^{N-1} w[n]x[n, l]e^{\frac{-j2\pi nk}{N}}, k = 0, 1, \ldots, N-1,$$

where w[n] is a windowing function, x[n,l] is a buffered and overlapped input signal frame, N is a size of the DFT size and k is a frequency bin index. The overlap may be fixed at any suitable percentage (e.g., 25%).

To determine harmonicity, harmonicity calculation block 55 may compute total power in a frame as:

$$E_x[l] = \sum_{k \in \mathcal{K}} |X[k, l]|^2$$

where $\mathcal{K}$ is a set of all frequency bin indices corresponding to the spectral range of interest. Harmonicity calculation block 55 may calculate a harmonic power as:

$$E_H[p, l] = \sum_{m=1}^{N_h} |X[mp, l]|^2, p \in \mathcal{P}$$

where $N_h$ is a number of harmonics, m is a harmonic order, and $\mathcal{P}$ is a set of all frequency bin indices corresponding to an expected pitch frequency range. The expected pitch frequency range may be set to any suitable range (e.g., 100-500 Hz). A harmonicity at a given frequency may be defined as a ratio of the harmonic power to the total energy without the harmonic power and harmonicity calculation block 55 may calculate harmonicity as:

$$H[p,l] = \frac{E_H[p, l]}{E_x[l] - E_H[p, l]}.$$

For clean speech signals, harmonicity may have a maximum at the pitch frequency. Because an impulsive noise spectrum may be less sparse than a speech spectrum, harmonicity for impulsive noises may be small. Thus, a harmonicity calculation block 55 may output a harmonicity-based test statistic (shown as "harmonicity" in FIG. 5) formulated as:

$$\gamma_{Harm}[l] = \max_{\forall p \in \mathcal{P}} H[p,l].$$

In many instances, most of impulsive noises corresponding to transient acoustic events tend to have more energy at lower frequencies. Moreover, the spectrum may also typically be less sparse at these lower frequencies. On the other hand, a spectrum corresponding to voiced speech also has more low-frequency energy. However, in most instances, a speech spectrum has more sparsity than impulsive noises. Therefore, one can examine the flatness of the spectrum at these lower frequencies as a deterministic factor. Accordingly, SFM block 58 may calculate a sub-band spectral flatness measure (shown as "sfm" in FIG. 5) computed as:

$$\gamma_{SFM}[l] = \frac{\sum_{k=N_L}^{N_H}[|X[k,l]|^2]^{1/N_B}}{\frac{1}{N_B}\sum_{k=N_L}^{N_H}|X[k,l]|^2}$$

where $N_B = N_H - N_L + 1$, $N_H$ and $N_L$ are the spectral bin indices corresponding to low- and high-frequency band edges respectively, of a sub-band. The sub-band frequency range may be of any suitable range (e.g., 500-1500 Hz).

An ability to differentiate speech from impulsive noise based on harmonicity may degrade when non-impulsive background noise is also present in an acoustic environment. Under such conditions, harmonic product spectrum block 56 may provide more robust harmonicity information. Harmonic product spectrum block 56 may calculate a harmonic product spectrum as:

$$G[p,l] = \prod_{m=1}^{N_h}|X[mp,l]|^2, p \in \mathcal{P}$$

where $N_h$ and $\mathcal{P}$ are defined above with respect to the calculation of harmonicity. The harmonic product spectrum tends to have a high value at the pitch frequency since the pitch frequency harmonics are accumulated constructively, while at other frequencies, the harmonics are accumulated destructively. Therefore, the harmonic product spectrum is a sparse spectrum for speech, and it is less sparse for impulsive noise because the noise energy in impulsive noise distributes evenly across all frequencies. Therefore, a flatness of the harmonic product spectrum may be used as a differentiating factor. Harmonic flatness measure block 57 may compute a flatness measure of the harmonic product spectrum (shown as "hpsSfm" in FIG. 5) as:

$$\gamma_{HSP-SFM}[l] = \frac{\prod_{p \in \mathcal{P}}[|G[p,l]|^2]^{1/N_\mathcal{P}}}{\frac{1}{N_\mathcal{P}}\sum_{p \in \mathcal{P}}|G[p,l]|^2}$$

where $N_\mathcal{P}$ is the number of spectral bins in the pitch frequency range.

An impulsive noise spectrum may exhibit spectral stationarity over a short period of time (e.g., 300-500 ms), whereas a speech spectrum may vary over time due to spectral modulation of pitch harmonics. Once a signal burst onset is detected, SFM swing block 59 may capture such non-stationarity information by tracking spectral flatness measures from multiple sub-bands over a period of time and estimate the variation of the weighted and cumulative flatness measure over the same period. For example, SFM swing block 59 may track a cumulative SFM over a period of time and may calculate a difference between the maximum and the minimum cumulative SFM value over the same duration, such difference representing a flatness measure swing. The flatness measure swing value may generally be small for impulsive noises because the spectral content of such signals may be wideband in nature and may tend to be stationary for a short interval of time. The value of the flatness measure swing value may be higher for speech signals because spectral content of speech signals may vary faster than impulsive noises. SFM swing block 59 may calculate the flatness measure swing by first computing the cumulative spectral flatness measure as:

$$\rho_{SFM}[l] = \sum_{i=1}^{N_s}\alpha(i)\left\{\frac{\prod_{k=N_L(i)}^{N_H(i)}[|X[k,l]|^2]^{1/N_B(i)}}{\frac{1}{N_B(i)}\sum_{k=N_L(i)}^{N_H(i)}|X[k,l]|^2}\right\}$$

where $N_B(i) = N_H(i) - N_L(i) + 1$, i is a sub-band number, $N_s$ is a number of sub-bands, $\alpha(i)$ is a sub-band weighting factor, $N_H(i)$ and $N_L(i)$ are spectral bin indices corresponding to the low- and high-frequency band edges, respectively of $i^{th}$ sub-band. Any suitable sub-band ranges may be employed (e.g., 500-1500 Hz, 1500-2750 Hz, and 2750-3500 Hz). SFM swing block 59 may then smooth the cumulative spectral flatness measure as:

$$\mu_{SFM}[l] = \beta^*\mu_{SFM}[l-1] + (1-\beta)\rho_{SFM}[l]$$

where $\beta$ is the exponential averaging smoothing coefficient. SFM swing block 59 may obtain the spectral flatness measure swing by computing a difference between a maximum and a minimum spectral flatness measure value over the most-recent M frames. Thus, SFM swing block 59 may generate a spectral flatness measure swing-based test statistic (shown as "sfmSwing" in FIG. 5) defined as:

$$\gamma_{SFM-Swing}[l] = \max_{\forall m=l,l-1,l-M+1}\mu_{SFM}[m] - \min_{\forall m=l,l-1,l-M+1}\mu_{SFM}[m].$$

Together, the statistics described above may define a feature vector which may be used as an input by neural network 70 (e.g., after pre-processing by feature vector pre-processing block 60). For example, the feature vector corresponding to an $l^{th}$ frame may be given by:

$$v:[E[l]\gamma_{os}[l]\gamma_{Harm}[l]\gamma_{SFM}[l]\gamma_{HPS-SFM}[l]\gamma_{SFMSwing}[l]]^T.$$

Figure 6:
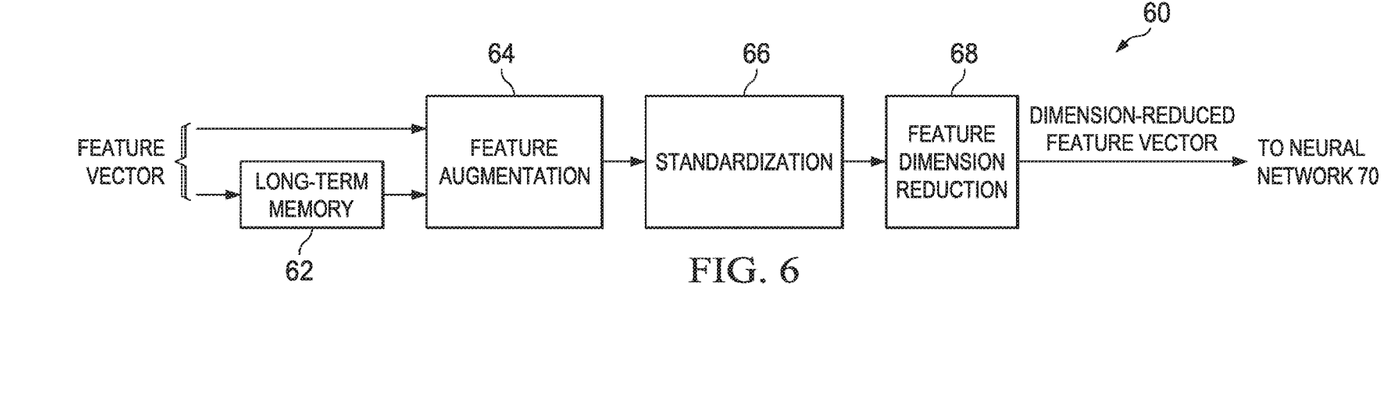
FIG. 6 illustrates a block diagram of an example feature vector pre-processing block, in accordance with embodiments of the present disclosure.

Because durations of impulsive noises may be longer than a frame size under consideration, impulsive noise detection performance of neural network 70 may be improved if feature vectors from multiple frames are used in the decision process. FIG. 6 illustrates a block diagram of an example feature vector pre-processing block 60, in accordance with embodiments of the present disclosure. As described below, feature vector pre-processing block 60 may augment a current feature set with the feature set of previous frames, and then further process such augmented feature set to generate a dimension-reduced feature vector to facilitate efficient computation by neural network 70.

As shown in FIG. 6, frames of a feature vector may be stored in a long-term memory 62 such that a feature augmentation block 64 may augment a current frame of the feature vector with a suitable number of past frames of the feature vector to generate an augmented feature vector that may be given as:

$$v':[E[l] \ldots \gamma_{SFMSwing}[l]E[l-1] \ldots \gamma_{SFMSwing}[l-1]E[l-L] \ldots \gamma_{SFMSwing}[l-L]]^T.$$

Because a dynamic range of each statistic in the feature vector may be different, standardization block 66 may normalize the statistics with respect to each other in order to reduce or eliminate feature bias. For example, in some embodiments, standardization block 66 may scale each statistic to have a zero mean and unit variance in a statistical sense. Thus, a raw statistic may be scaled as:

$$\vartheta_i^s = \frac{\vartheta_i^r - \mu_i^r}{\sigma_i^r}$$

where $\sigma_i^r[l]$ and $\sigma_i^s[l]$ are the raw and scaled $i^{th}$ feature respectively, $\mu_i^r$ and $\sigma_i^r$ are the mean and standard deviation of $i^{th}$ feature and they are obtained using the sample mean/variance estimate as:

$$\mu_i^r = \frac{1}{K}\sum_{k=1}^{K} \vartheta_i^{r,k}$$

$$\sigma_i^r = \sqrt{\frac{1}{K}\sum_{k=1}^{K} \left(\vartheta_i^{r,k} - \mu_i^r\right)^2}$$

where K is the number of training samples, $\vartheta_i^{r,k}$ corresponds to the $i^{th}$ raw feature from $k^{th}$ training sample.

Because augmentation of the feature vector with past frames increases the feature dimension of the feature vector, the number of weights needed in neural network 70 to process the feature vector may be affected. Accordingly, feature dimension reduction block 68 may reduce the feature dimension of the normalized augmented feature vector to generate a dimension-reduced feature vector for more efficient processing by neural network 70. For example, the temporal correlation that exists between successive frames may increase feature redundancy, and feature dimension reduction such as principle component analysis may be employed by feature dimension reduction block 68 to compress the feature set. To illustrate, the principal components may be estimated by first estimating a covariance matrix of the feature vector as:

$$C_\vartheta = \frac{1}{K}\sum_{k=1}^{K} \vartheta^{s,k^T} \vartheta^{s,k}$$

where $\vartheta^{s,k}$ is the $k^{th}$ standardized training sample. The covariance matrix may be decomposed using an eigen analysis as:

$$C_\vartheta = UDU^T$$

where D is a diagonal matrix containing the eigen values sorted in descending order, U is the matrix containing the unitary eigen vectors and the superscript T represents the matrix transpose. The principal components may be obtained by selecting the eigen vectors corresponding to not insignificant eigen values. These eigen values may be chosen by either comparing the fraction of an eigen value to the maximum value or by selecting all the eigen values whose cumulative value encompasses a certain percentage of the signal energy. For example, a threshold of 99% of the signal energy may be used as a threshold for the eigen vector selection. Thus, the feature dimension may be reduced by applying a linear transform on the feature vector as:

$$\vartheta = \begin{bmatrix} u_1^T \\ \vdots \\ u_P^T \end{bmatrix} \vartheta^s$$

where $u_1$ corresponds to the eigen vector corresponding to the largest eigen value, P is the number of principal components, $\vartheta^s$ is the standardized feature vector and $\vartheta$ is the dimension reduced feature vector.

Figure 7:
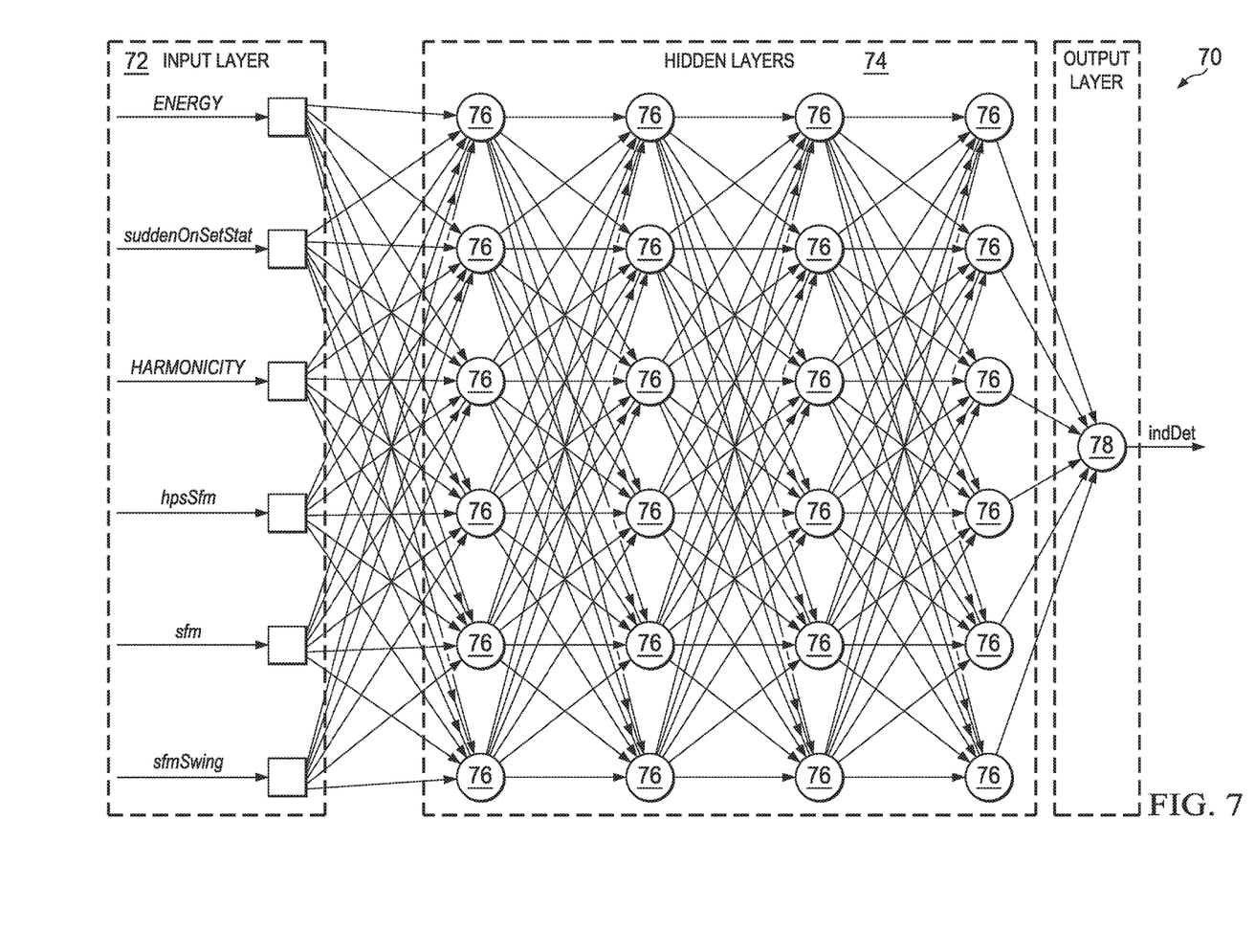
FIG. 7 illustrates a block diagram of an example neural network for detecting acoustic impulse events, in accordance with embodiments of the present disclosure.

FIG. 7 illustrates a block diagram of an example neural network 70 for detecting acoustic impulse events, in accordance with embodiments of the present disclosure. As shown in FIG. 7, neural network 70 may comprise an input layer 72 of the statistics described above (e.g., as pre-processed by feature vector pre-processing block 60 to generate a dimension-reduced feature vector) and a plurality of hidden layers 74 comprising neurons 76 coupled together via synapses which may perform neural processing to determine if an impulsive noise event is present, to generate a single-output output layer 78 that may output a signal indDet indicative of a determination of the presence of impulsive noise.

Figure 8:
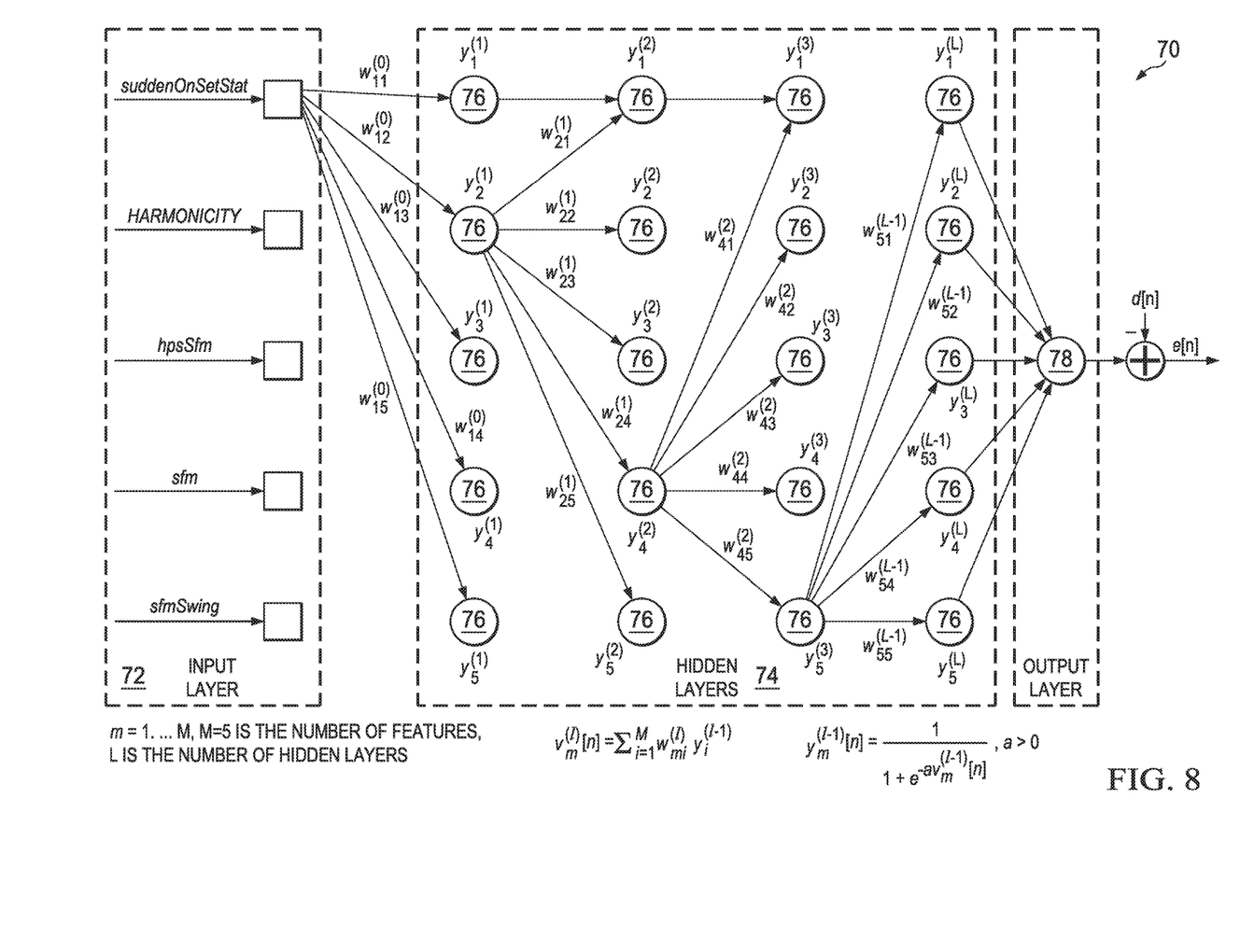
FIG. 8 illustrates a block diagram of an example neural network for detecting acoustic impulse events with example weights associated with each of the synaptic connections between neurons in different layers and example corresponding non-linear functions used at each neuron, in accordance with embodiments of the present disclosure.

FIG. 8 illustrates a block diagram of an example neural network 70 for detecting acoustic impulse events with example weights associated with each of the synaptic connections between neurons 76 in different layers and example corresponding non-linear functions used at each neuron 76, in accordance with embodiments of the present disclosure. The various weights of the neural network may be computed by training the neural network with a set of training samples. A desired output d[n] corresponding to output signal indDet for the training samples may be generated by labeling each frame of data as either impulsive noise or not. The neural weights set forth in FIG. 8 may be calculated by reducing an error e[n] between output signal indDet and the desired output d[n]. Error e[n] may be back propagated to input layer 72 and the various weights may be updated recursively using a back propagation algorithm as follows:

For output layer 78:

$$w_{ml}^{(L)}[n+1] = w_{ml}^{(L)}[n] + \mu \delta_m^{(L)}[n] y_m^{(L)}[n], m = 1, \ldots, M(L)$$

$$\delta_m^{(L)}[n] = e[n]\varphi'\{v_m^{(L)}[n]\}$$

$$e[n] = y_1^{(L+1)}[n] - d[n]$$

$$\varphi'\{v_m^{(L)}[n]\} = \frac{ae^{-av_m^{(L)}[n]}}{\left[1 + e^{-av_m^{(L)}[n]}\right]^2}$$

For hidden layers 74:

$$w_{mi}^{(l)}[n+1] = w_{mi}^{(l)}[n] + \mu \delta_m^{(l)}[n] y_m^{(l)}[n],$$

$$m = 1, \ldots, M(l), i = 1, \ldots, M(l+1), l = 1, \ldots, L-1$$

-continued $$\delta_m^{(l)}[n] = \varphi'\{v_m^{(l)}[n]\}\sum_{k=1}^{M(l)}\delta_k^{(l+1)}[n]w_{mk}^{(l)}[n]$$

where M(l) is the number of nodes in layer l. In some embodiments, neural network 70 may be trained using a scaled conjugate gradient back propagation update method that has smaller memory requirements at the expense of more iteration required for convergence of weights. A cross-entropy error may be used in the cost function. The cross-entropy error may be given by:

$$C_\varepsilon = \frac{1}{K}\sum_{k=1}^{K} d_k \log(y_k^{L+1}) + (1 - d_k)\log(1 - y_k^{L+1})$$

where $y_k^{L+1}$ is the neural network output corresponding to $k^{th}$ training sample.

Figure 9:
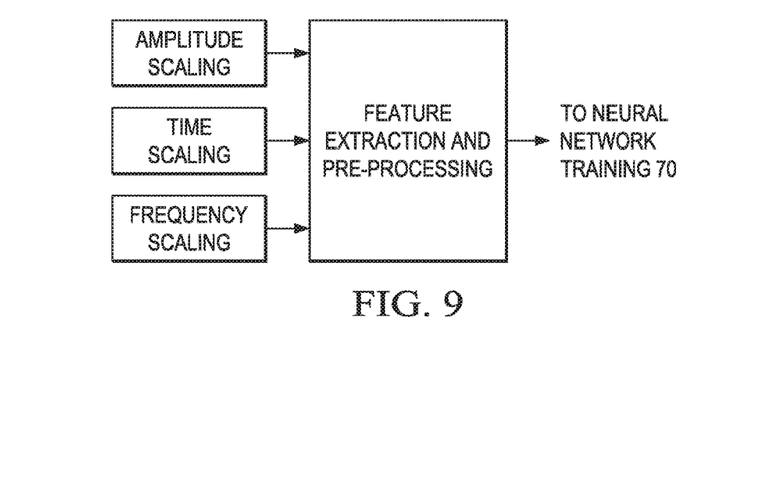
FIG. 9 illustrates a block diagram of an example approach to augmenting neural network training data, in accordance with embodiments of the present disclosure.

In order to reduce generalization error, neural network 70 must be trained with a large volume of training data. The training data may be increased by augmenting the available training samples through amplitude, time, and frequency scaling, as shown in FIG. 9. Such data augmentation may help neural network 70 to be invariant to amplitude, time and frequency scaling. This may be advantageous for an impulsive noise detector because impulsive noises are random in nature and the amplitude, and duration and spectrum of impulsive noises can vary depending on the stimulus source. For example, if $\{(v_1,d_1), (v_2,d_2), \ldots (v_K,d_K)\}$ represents K training sample sets, then an augmented training set obtained by amplitude scaling the input signal, $x^g[n]=gx[n]$ may be represented as $\{(v_1,d_1), (v_2,d_2), \ldots (v_K,d_K), (v_1^g,d_1), (v_2^g,d_2), \ldots (v_K^g,d_K)\}$.

Figure 10:
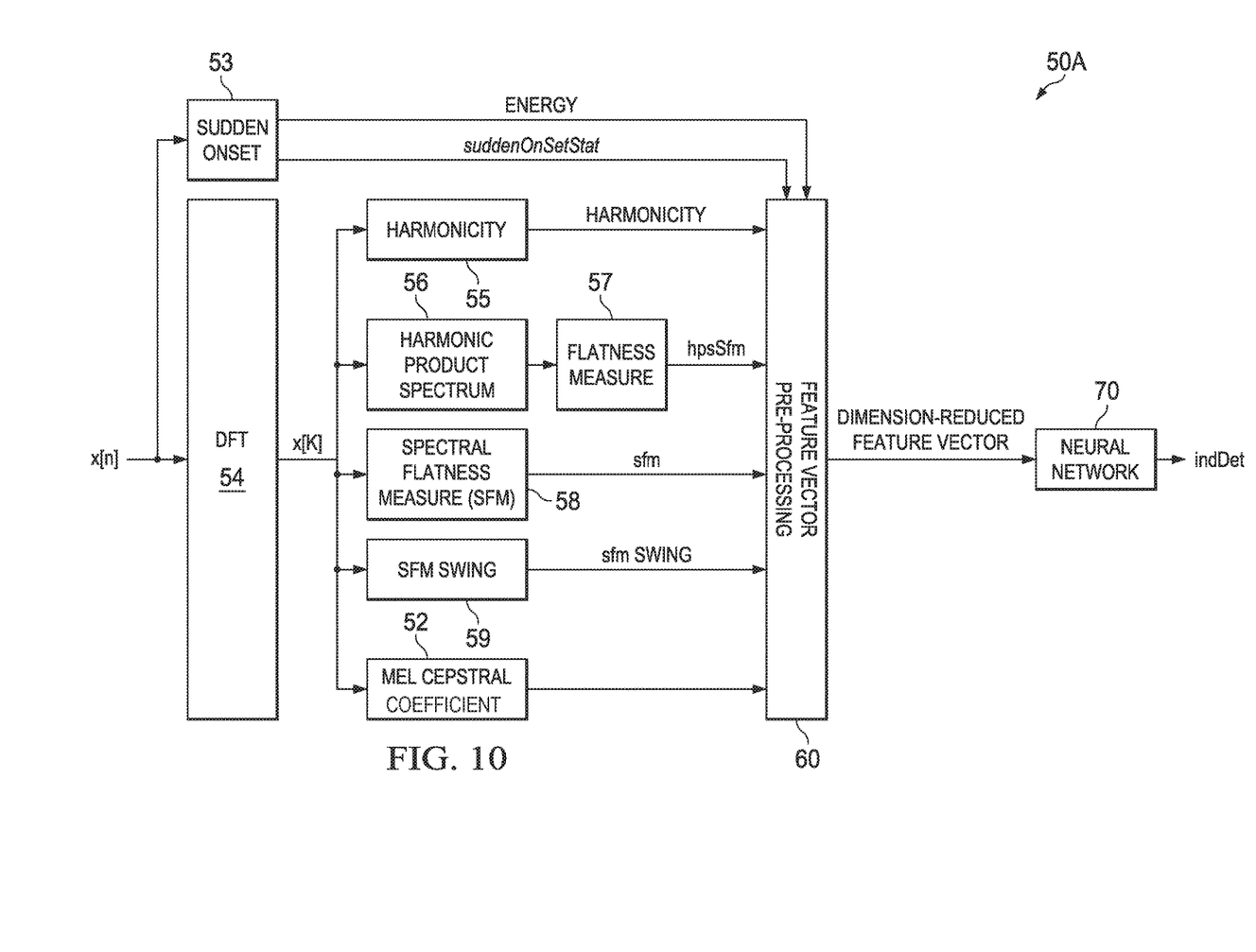
FIG. 10 illustrates a block diagram of an example impulsive noise detector, in accordance with embodiments of the present disclosure.

FIG. 10 illustrates a block diagram of another example impulsive noise detector 50A, in accordance with embodiments of the present disclosure. Impulsive noise detector 50A may be similar to impulsive noise detector 50 of FIG. 5, with a feature vector used by neural network 70 enhanced with mel cepstral coefficients of the input audio signal x[n], which may be extracted by mel cepstral coefficients block 52. Inclusion of mel cepstral coefficients in the feature vector may increase the performance of neural network 70, at the cost of increased processing resources required due to the increased number of neurons needed due to the increase in feature dimension that results.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

What is claimed is:

1. An integrated circuit for implementing at least a portion of an audio device, comprising:
   an audio input for receiving audio information to be reproduced;
   an audio output configured to reproduce the audio information by generating an audio output signal for communication to at least one transducer of the audio device;
   a microphone input configured to receive an input signal indicative of ambient sound external to the audio device; and
   a processor configured to implement an impulsive noise detector comprising:
      a plurality of processing blocks for determining a feature vector based on characteristics of the input signal, wherein the feature vector comprises a statistic indicative of a degree of temporal modulation of a signal spectrum of the input signal;
      a pre-processing block configured to:
         augment the feature vector with at least one previous frame of the input signal to generate an augmented feature vector, wherein the augmented feature vector has an increased feature redundancy relative to the feature vector based on temporal correlations between frames; and
         reduce the feature redundancy of the augmented feature vector via feature dimension reduction; and
      a neural network for determining, based on the augmented feature vector, whether an impulsive event comprises a speech event or a noise event, wherein the neural network is trained with an augmented training data set based on amplitude, time, and frequency scaling of an initial training data set of impulsive noise events;
   wherein the processor is further configured to modify the generated audio output signal based on the determination of the neural network.

2. The integrated circuit of claim 1, wherein the processor is further configured to modify a characteristic associated with the audio information in response to detection of a noise event.

3. The integrated circuit of claim 2, wherein the characteristic comprises one or more of an amplitude of the audio information and spectral content of the audio information.

4. The integrated circuit of claim 2, wherein the characteristic comprises at least one coefficient of a voice-based processing algorithm including at least one of a noise suppressor, a background noise estimator, an adaptive beamformer, dynamic beam steering, always-on voice, and a conversation-based playback management system.

5. The integrated circuit of claim 1, wherein the feature vector further comprises statistics indicative of harmonicity and sparsity of the signal spectrum of the input signal to determine whether the impulsive event comprises a speech event or a noise event.

6. The integrated circuit of claim 5, wherein the harmonicity at a particular frequency is based on a ratio of total energy to harmonic energy.

7. The integrated circuit of claim 5, wherein the sparsity is based on a harmonic product spectrum and a spectral flatness measure of the input signal.

8. The integrated circuit of claim 1, wherein the feature vector comprises a statistic indicative of an acoustic energy present in the input signal.

9. The integrated circuit of claim 1, wherein the feature vector comprises a statistic indicative of an occurrence of a signal burst event of the input signal.

10. The integrated circuit of claim 9, wherein the statistic indicative of the occurrence of the signal burst event is based on a normalized signal energy normalized by an instantaneous signal dynamic range.

11. The integrated circuit of claim 1, wherein the feature vector comprises a statistic indicative of mel cepstral coefficients of the input signal.

12. The integrated circuit of claim 1, wherein the pre-processing block is further configured to:
normalize statistics of the augmented feature vector with respect to each other.

13. The integrated circuit of claim 1, wherein the temporal modulation is based on changes in a sub-band spectral flatness measure of the input signal.

14. A method for impulsive noise detection comprising:
receiving, at an audio input, audio information to be reproduced;
receiving an input signal indicative of ambient sound external to an audio device;
determining a feature vector based on characteristics of the input signal, wherein the feature vector comprises a statistic indicative of a degree of temporal modulation of a signal spectrum of the input signal;
augmenting the feature vector with at least one previous frame of the input signal to generate an augmented feature vector, wherein the augmented feature vector has an increased feature redundancy relative to the feature vector based on temporal correlations between frames;
reducing the feature redundancy of the augmented feature vector via feature dimension reduction;
using a neural network to determine, based on the augmented feature vector, whether an impulsive event comprises a speech event or a noise event, wherein the neural network is trained with an augmented training data set based on amplitude, time, and frequency scaling of an initial training data set of impulsive noise events; and
reproducing the audio information by generating an audio output signal for communication to at least one transducer of an audio device based on the input signal and the determination of whether the impulsive event comprises a speech event or a noise event, wherein the generated audio output signal is modified based on the determination of the neural network.

15. The method of claim 14, further comprising modifying a characteristic associated with the audio information in response to detection of a noise event.

16. The method of claim 15, wherein the characteristic comprises one or more of an amplitude of the audio information and spectral content of the audio information.

17. The method of claim 15, wherein the characteristic comprises at least one coefficient of a voice-based processing algorithm including at least one of a noise suppressor, a background noise estimator, an adaptive beamformer, dynamic beam steering, always-on voice, and a conversation-based playback management system.

18. The method of claim 14, wherein the feature vector comprises statistics indicative of harmonicity and sparsity of the signal spectrum of the input signal to determine whether the impulsive event comprises a speech event or a noise event.

19. The method of claim 18, wherein the harmonicity at a particular frequency is based on a ratio of total energy to harmonic energy.

20. The method of claim 18, wherein the sparsity is based on a harmonic product spectrum and a spectral flatness measure of the input signal.

21. The method of claim 14, wherein the feature vector comprises a statistic indicative of an acoustic energy present in the input signal.

22. The method of claim 14, wherein the feature vector comprises a statistic indicative of an occurrence of a signal burst event of the input signal.

23. The method of claim 22, wherein the statistic indicative of the occurrence of the signal burst event is based on a normalized signal energy normalized by an instantaneous signal dynamic range.

24. The method of claim 14, wherein the feature vector comprises a statistic indicative of mel cepstral coefficients of the input signal.

25. The method of claim 14, further comprising normalizing statistics of the augmented feature vector with respect to each other.

26. The method of claim 14, wherein the temporal modulation is based on changes in a sub-band spectral flatness measure of the input signal.

* * * * *